Dec. 7, 1965 J. E. STEUP 3,222,606
DETECTOR FOR AM, CW, OR SSB SIGNALS
PROVIDING INHERENT AGC SIGNAL
Filed Sept. 4, 1962
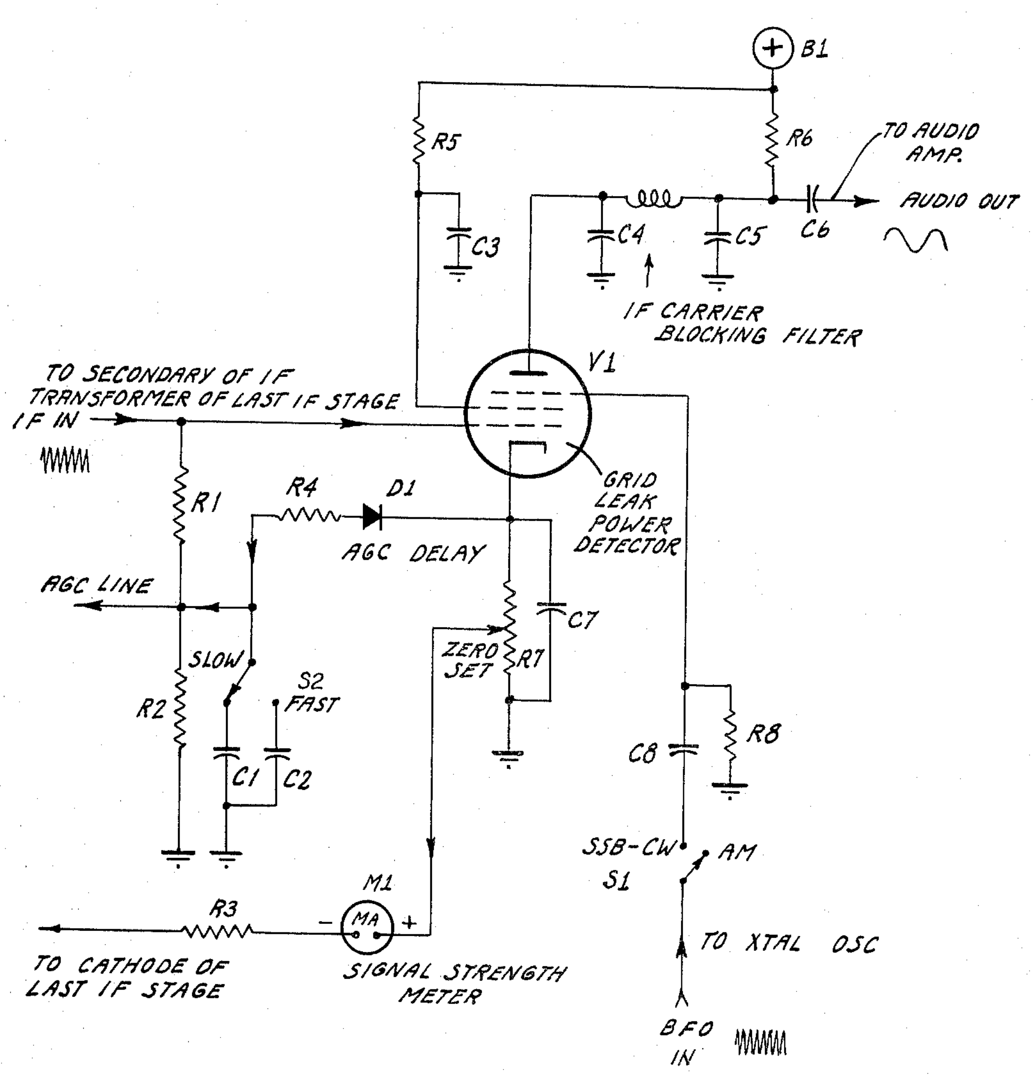
INVENTOR.
JOHN E. STEUP
BY
Dean V. [signature]
ATTORNEY United States Patent Office 3,222,606
Patented Dec. 7, 1965

3,222,606
DETECTOR FOR AM, CW, OR SSB SIGNALS PROVIDING INHERENT AGC SIGNAL

John E. Steup, Arlington, Calif., assignor to Philco Corporation, Philadelphia, Pa., a corporation of Delaware Filed Sept. 4, 1962, Ser. No. 221,291
6 Claims. (Cl. 329—1)

This invention relates to a signal detector for use in a radio receiver, and more particularly to a detector designed for use with amplitude modulated (AM), single side band (SSB), and continuous wave (CW) signals.

In the past it has been the general practice to use three separate detectors within one receiver for reception of AM, SSB, and CW signals. This practice was necessitated primarily because different methods of detection are required for the three modes of communication: detection of CW signals requires a local or beat frequency oscillator (BFO) which is detuned from the incoming carrier, e.g., by 1000 cycles; detection of SSB signals requires a BFO signal which is locked to the suppressed carrier in order to supply the proper beat frequency for faithful reproduction of the intelligence signal; while in detection of AM signals no BFO is required. When an automatic gain control (AGC) signal is desired with AM signals, it can be obtained at the detector, but with SSB and CW reception the AGC signal must be obtained before the detector stage; otherwise the BFO, which is part of the detector, will register as a powerful incoming signal and turn down the gain accordingly.

Regnier, in Patent No. 2,811,638, issued October 29, 1957, describes a unitized three way detector which is responsive to either AM, SSB, or CW signals according to the positions of switches 30 and 26. Regnier's detector, however, requires extra filtering and relatively complicated switching connections. Additionally, no provision is available in the Regnier arrangement for the derivation of an AGC signal.

The present invention, by utilizing unique circuitry including a pentode, provides a simple, reliable and efficient unitized three way detector for use with AM, SSB, or CW signals, while providing an inherent, readily available AGC signal.

OBJECTS

The objects of the present invention, therefore, are: (1) to provide a novel and improved detector, (2) to provide a detector suitable for operation with AM, SSB, or CW signals which additionally produces an AGC voltage, and (3) to provide a novel and simplied pentode detector. Other objects and advantages of the invention will be apparent as the following summary and specification is considered.

SUMMARY

For AM signal reception with the detector of the present invention the incoming intermediate frequency (IF) signal is applied to the first grid of a pentode biased for grid leak power detection. The intelligence signal appears as recified variations in plate current where it is recovered by means of a suitable filter.

For SSB and CW signal reception, operation is similar to the AM mode except that a BFO signal is applied to the third grid of the pentode where it modulates the plate current to provide the CW tone or the side band intelligence which are likewise recovered by filtering.

In all three modes of operation the AGC signal is obtained across the cathode resistor of the pentode circuit, where, due to the characteristic of pentodes, it is not affected by the BFO signal.

DESCRIPTION—STRUCTURE

The structure of the single figure of the drawing is self-explanatory. It may be noted that D1 is a threshold diode, designed to give suitable AGC delay by blocking transmission of the AGC signal until the voltage thereof rises above a predetermined value. In the following list of component values and operational description "R," "B," "C," "L," "M," "D," and "V," respectively, stand for "resistor," "battery," "capacitor," "inductor," "meter," "diode," and "vacuum tube." Use of the following component values effected satisfactory operation of a detector built in accordance with the principles of the invention.

*Resistors*

| | | |
|---|---|---|
| R1 | meg | 1 |
| R2 | meg | 3 |
| R3 | k | 1 |
| R4 | k | 300 |
| R5 | k | 1 |
| R6 | k | 1 |
| R7 | k | 2 |
| R8 | meg | 1 |

*Capacitors*

| | | |
|---|---|---|
| C1 | mf | 0.1 |
| C2 | mf | 0.04 |
| C3 | mf | 0.1 |
| C4 | pf | 100 |
| C5 | mf | 0.003 |
| C6 | mf | 0.01 |
| C7 | mf | 20 |
| C8 | pf | 100 |

*Miscellaneous*

| | | |
|---|---|---|
| B1 | v | 150 |
| V1 | | 6AS6 |
| D1 | | 1N91 |
| L1 | mh | 1 |
| M1 | ma | 0–1 |

*Operation AM Reception*

For AM reception S1 is thrown to the AM position to disconnect the BFO signal from the circuit. The AM-modulated carrier, at intermediate frequency and having sufficient amplitude to cause the grid of V1 to draw current, is applied to the control grid of V1 where it is rectified according to well-known grid leak power detector principles and this rectified voltage is amplified in the plate circuit. The filter separates out the IF carrier and the intelligence signal is obtained through coupling capacitor C6.

*CW–SSB reception*

For detection of CW or SSB signals S1 is closed and the BFO signal is applied to the suppressor grid. In this mode of operation the BFO signal is mixed with the CW or SSB signal (which appears as variations in plate current) and the beat frequency (CW tone or the side band) is recovered in the audio plate filter.

*AGC operation*

When the IF signal is applied to the grid-cathode circuit of V1 a rectified version thereof appears across cathode resistor R7. C7 filters out the IF components present thus providing a signal at the cathode which is suitable for AGC purposes. AGC delay diode D1 is a threshold device which blocks the AGC signal until the signal strength reaches a suitable level. S2 may be positioned to control the speed at which the AGC follows signal strength variations by placing either C1 or C2 in shunt with the AGC line.

An advantageous feature of the invention resides in the fact that the AGC is not affected by the BFO signal. This is due to the fact that the signal applied to the suppressor grid does not modulate the cathode current; it modulates only the ratio of plate to screen current.

*Miscellaneous*

A signal strength meter, if desired may be connected between the detector and preceding IF stage as shown.

The detector illustrated, with component values given above, was wired into an existing receiver whose AGC rectifier, AGC detector, AGC IF amplifier, signal strength meter amplifier, AM detector, and SSB-CW detector were all disconnected. The detector worked satisfactorily for all modes of operation, and additionally, reduced the number of stages, parts, and power required, as well as space occupied by the receiver.

The instant invention is not to be limited by the above description and specific details since many modifications thereof which fall within the true scope of the inventive concept will be apparent to those conversant with the art. The invention is defined only by the appended claims.

I claim:

1. In combination:

(a) a vacuum tube having a cathode, an anode, and a plurality of grids operatively positioned between said cathode and said anode, (b) a source of intelligence bearing carrier signal connected to one of said grids, said signal having sufficient amplitude to cause said grid to draw current, (c) a source of beat frequency oscillations selectively connectable to another of said grids, (d) an output connection at the cathode of said tube for providing a feedback gain control voltage, and (e) an output connection at the anode of said tube for deriving an intelligence signal thereat.

2. The combination of claim 1 wherein said vacuum tube is a pentode.

3. A detector comprising:

(a) a pentode biased for grid leak power detection, (b) means for applying an intelligence-bearing carrier signal to the control grid of said pentode, (c) means for selectively applying a beat frequency signal to the suppressor of said pentode, (d) means for deriving automatic gain control signal from the cathode of said pentode, and (e) means for deriving a detected output from the plate of said pentode.

4. A detector suitable for use with amplitude modulated, single sideband, and continuous wave signals comprising:

(a) a pentode having a source of intelligence bearing intermediate frequency carrier signal connected to its control grid and having sufficient amplitude to cause said pentode to function as a grid leak power detector, (b) a resistance and a capacitor connected in parallel from the cathode of said pentode to ground, (c) an automatic gain control circuit connected to the cathode of said pentode, (d) a source of beat frequency oscillations connected to the suppressor of said pentode through a switch, and (e) a filter connected to the plate of said pentode and designed to block said intermediate frequency and pass said intelligence.

5. In combination:

(a) a vacuum tube having a cathode, an anode, and a plurality of grids, wherein the anode and cathode currents of said tube are controllable by the signal on a first grid of said plurality, said anode current is also controllable by the signal on a second grid of said plurality, and said cathode current is independent of the signal on said second grid, (b) means for supplying an intelligence bearing carrier signal to said first grid at an amplitude sufficient to cause said grid to draw current, (c) means for selectively supplying a beat frequency signal to said second grid, (d) an output connection at the cathode of said tube for providing a feedback gain control voltage, and (e) an output connection at the anode of said tube for deriving an intelligence signal thereat.

6. The combination of claim 5 wherein said tube is a pentode, said first grid is the control grid thereof, and said second grid is the suppressor grid thereof.

References Cited by the Examiner

UNITED STATES PATENTS

| | | | |
|---|---|---|---|
| 2,118,111 | 5/1938 | Schade | 329—177 X |
| 2,125,003 | 7/1938 | Harries | 325—491 X |
| 2,616,035 | 10/1952 | Adler et al. | 325—441 |
| 2,811,638 | 10/1957 | Regnier | 325—330 X |

FOREIGN PATENTS

| | | |
|---|---|---|
| 518,437 | 2/1940 | Great Britain. |

OTHER REFERENCES

Terman, Radio Engineers' Handbook, McGraw-Hill Book Co., New York, 1943, p. 564.

ROBERT H. ROSE, *Primary Examiner.*

DAVID G. REDINBAUGH, *Examiner.*